(12) United States Patent
Shaw et al.

(10) Patent No.: US 9,415,332 B2
(45) Date of Patent: Aug. 16, 2016

(54) SELF PURGE FILTRATION APPARATUS FOR DISCHARGE TO SUBATMOSPHERIC CONDITIONS

(71) Applicants: Brandon L. Shaw, Kalamazoo, MI (US); Christopher Scott Rau, Battle Creek, MI (US)

(72) Inventors: Brandon L. Shaw, Kalamazoo, MI (US); Christopher Scott Rau, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 496 days.

(21) Appl. No.: 14/134,523

(22) Filed: Dec. 19, 2013

(65) Prior Publication Data

US 2015/0174513 A1    Jun. 25, 2015

(51) Int. Cl.
*B01D 29/64* (2006.01)
*B01D 35/027* (2006.01)
*B01D 29/66* (2006.01)
*B01D 29/23* (2006.01)
*B01D 29/82* (2006.01)
*B01D 29/94* (2006.01)

(52) U.S. Cl.
CPC ............ *B01D 35/0276* (2013.01); *B01D 29/23* (2013.01); *B01D 29/64* (2013.01); *B01D 29/6484* (2013.01); *B01D 29/665* (2013.01); *B01D 29/66* (2013.01); *B01D 29/824* (2013.01); *B01D 29/94* (2013.01)

(58) Field of Classification Search
None
See application file for complete search history.

(56) References Cited

U.S. PATENT DOCUMENTS

| | | | |
|---|---|---|---|
| 4,518,501 A * | 5/1985 | Lennartz | B01D 29/23 210/411 |
| 4,549,961 A | 10/1985 | Bellemann et al. | |
| 5,364,539 A | 11/1994 | Castagno et al. | |
| 5,569,383 A | 10/1996 | Vander Ark, Jr. et al. | |
| 7,883,624 B2 * | 2/2011 | Robert | B04C 5/13 210/304 |
| 8,524,075 B1 | 9/2013 | Quintel | |

OTHER PUBLICATIONS

Galiana Lopez, Paula (Authorized Officer), International Search Report for PCT/US2014/065136, 4 pages, Mailed Apr. 3, 2015, European Patent Office.

* cited by examiner

*Primary Examiner* — Terry Cecil
(74) *Attorney, Agent, or Firm* — Fay Sharpe LLP

(57) ABSTRACT

A self-purging filtering apparatus having a pressure vessel connected for discharging clean filtrate to subatmospheric pressure at a pump inlet. Actuators connected to an outwardly extending rod move a wiper piston to scrub the upstream side of an annular filter media element. The piston moves a main valve member to isolate a purge chamber from the filtering chamber. Remotely operated valves control flushing of the purged chamber. The main valve has a bleed valve to provide pressure equalization for facilitating main valve movement.

18 Claims, 6 Drawing Sheets

SELF PURGE FILTRATION APPARATUS FOR DISCHARGE TO SUBATMOSPHERIC CONDITIONS

BACKGROUND

The present disclosure relates to fluid filtration apparatus or units of the type intended for providing fluid filtration of liquids such as water or hydraulic fluid in systems where the filtration unit is connected to discharge clean filtered fluid to the suction side or pump inlet for providing pressurized fluid to the system.

Systems of this type typically employ a filtering cartridge disposed in a fluid pressure vessel which may be of the type having a removable lid to facilitate replacement of the filtering cartridge. However, such arrangements have the disadvantage that replacement or cleaning of the cartridge requires shut down of the system and depressurization of the pressure vessel. Therefore, in order to extend the period between replacement or service, it has been desired to provide a self-cleaning mechanism for removing debris deposited on the upstream side of the filtering cartridge without the necessity of depressurizing the system and interrupting the flow of filtered fluid to the process system. Heretofore, fluid filtering systems of this type have been provided with a wiper mechanism for scraping debris from the upstream side of the filter media element and purging the debris through a drain outlet for disposal. However, such systems have been operated with a positive pressure, both at the fluid inlet to the filtering media element and at subatmospheric pressure at the filtered fluid discharge outlet.

However, in certain fluid process systems it has been desired to operate the filtering unit discharge outlet connected to the suction side of the system or the circulating pump inlet in order to increase flow through the filter media element and to provide clean fluid to the pump. In such filtration systems, with the filtrate outlet connected to subatmospheric pressure, it has not been workable, in view of the need for positive pressure, to effect the self-cleaning and purging operations. Thus, it has been desired to provide a way or means of utilizing existing fluid filtration systems of the type having an annular filter media unit cartridge in a pressurized fluid vessel and to provide for self-cleaning or wiping of the upstream side of the filter element without necessity of depressurizing the system and interrupting the flow filtered fluid through the process system with the downstream side of the filter media element maintained at subatmospheric pressures.

SUMMARY

The present disclosure describes a fluid filtering apparatus or unit comprising a pressure vessel with an annular filter media element exposed therein with the interior or upstream side of the filter media element communicating exclusively with the fluid pressure vessel inlet; and, the exterior or downstream side of the filter media element isolated for communicating exclusively with the filtrate outlet of the pressure vessel. A piston is provided within the interior of the filter media element and is movable by a rod connected thereto and extending exteriorly of the pressure vessel for movement by a selectively operable actuator. The pressure vessel has a bulkhead creating on one side a purge chamber which has a separate purge fluid pressure inlet with a remotely activated inlet valve; and, the purge chamber also has a drain outlet with a remotely activated drain valve. The piston includes wipers for scraping accumulated debris from the upstream or interior side of the filter media element. When the piston is in a retracted position a main valve attached to the piston which opens a main valve passage in the bulkhead to permit fluid into the purge chamber. When the piston is moved downwardly to scrape debris from the filter media element and reaches the end of its stroke, the main valve closes isolating the purge chamber from the filtering chamber. Subsequently, sequential opening of a drain valve and the purge valve permits pressurized fluid to be applied through the separate purge fluid inlet to the purge chamber and flushes accumulated debris from the purge chamber through the open drain valve. Upon completion of the purge, the drain valve and purge valve are closed. The piston is then moved upwardly for retraction, whereupon initial movement of the piston opens a bleed valve provided in the main valve to permit pressure equalization between the purge chamber and the filtration chamber thereby enabling withdrawal of the main valve with the piston to the retracted position. Thus, the outlet of the pressure vessel can be connected to the suction side of a system or the inlet of a pump for continued filtering flow during cleaning of the filter media and the purging chamber isolated from the filtering chamber and purged without interrupting filtration flow.

DETAILED DESCRIPTION

Figure 1:
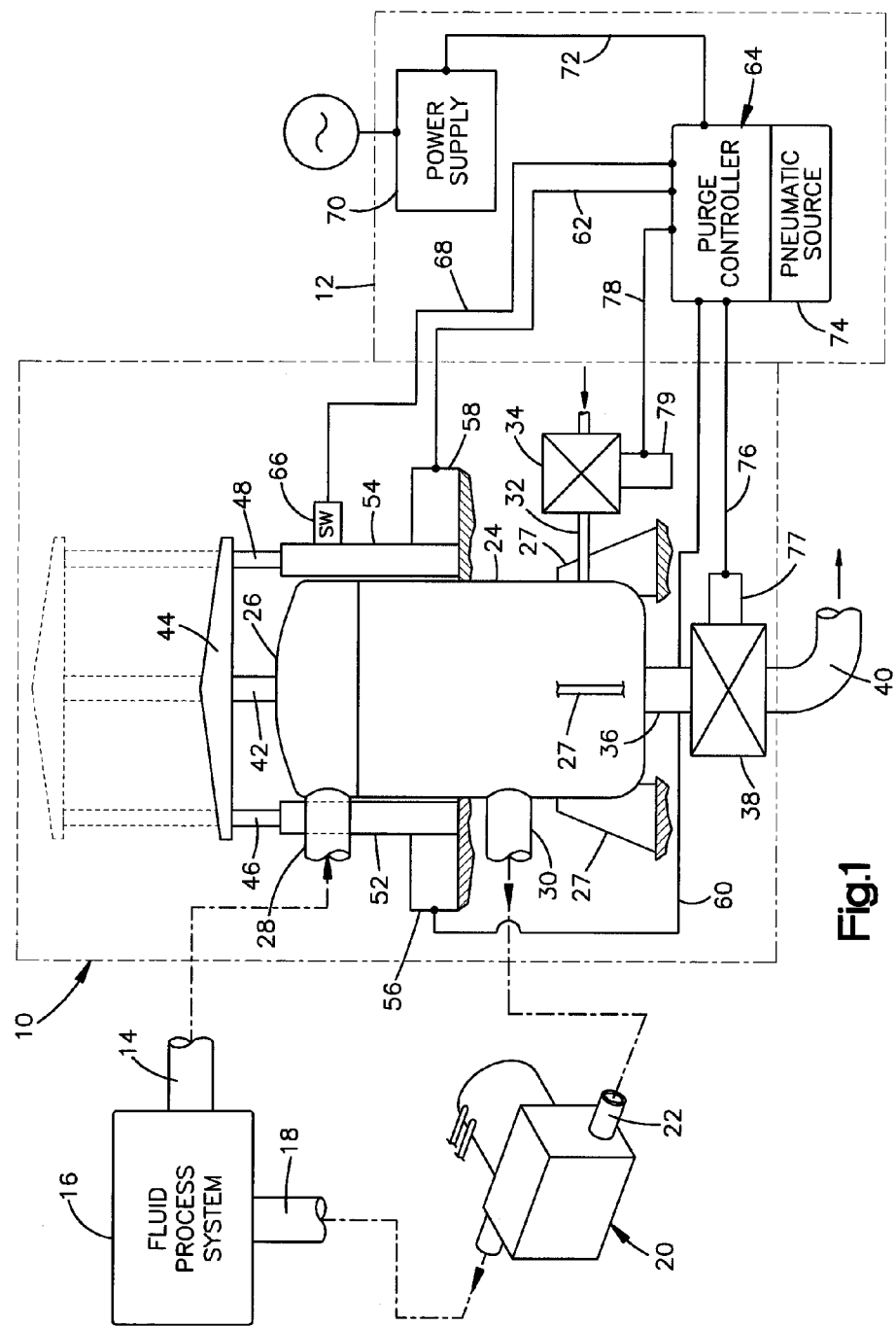
FIG. 1 is a schematic of the filtering apparatus of the present disclosure connected in a fluid conduct for filtering fluid in a process system with the filtering apparatus discharging to a subatmospheric condition illustrated as the inlet side of a pump.

Referring to FIG. 1, a fluid filtration system is illustrated and includes a filtering apparatus or unit shown generally at 10, with an ancillary control section indicated generally at 12, and the apparatus 10 is connected through the conduit 14 to receive fluid to the filter from a fluid process system 16 which is supplied through conduit 18 by a pump indicated generally at 20, which receives at its inlet 22 filtered fluid discharging from the apparatus 10 as will hereinafter be described. It will be understood that, alternatively, the fluid to be filtered through the system 10 conduit 14 may be supplied by a reservoir (not shown) with the pump 20 supplying the filtered fluid in an open loop arrangement to the fluid process system 16. Alternatively, the pump 20 may supply filtered fluid to a holding reservoir (not shown).

The apparatus 10 includes a pressure vessel having a removable lid 26; and, in the version illustrated, is a generally cylindrical shell oriented vertically and supported by legs 27 attached thereto. The fluid supply conduit 14 is attached to an inlet fitting 28 provided in pressure vessel 24; and, the pump inlet conduit 22 is connected through an outlet fitting 30 provided through the side wall of the pressure vessel 24 for discharging filtered fluid at subatmospheric pressure.

A purge inlet conduit 32 is connected to the outlet of a remotely controlled purge valve 34 for providing a flow of purge fluid into a purge chamber formed in vessel 24 as will hereinafter be described. A drain outlet 36 is connected to the inlet of a remotely controlled drain valve 38 which discharges debris from the filtering chamber in vessel 24 through a drain outlet 40.

An operating rod 42 extends through the lid 26 and is connected to a cross beam 44 which has at each opposite end thereof, piston rods respectively, 46, 48. The piston rods 46, 48 extend from fluid pressure operated cylinders 52, 54, respectively, which are operated by electrically operated fluid pressure sources respectively, 56, 58. The operating rod 42 and cross beam 44 are shown in their downward most operating position in solid outline in FIG. 1 and in the extended position in dashed line. Although the operating rod 42 is illustrated in FIG. 1 as moved by a pair of actuators connected to the cross beam 44, it will be understood that alternatively, a single actuator may be provided if desired and connected directly to the operating rod 42.

Fluid supplies 56, 58 for actuators 52, 54, are respectively connected by leads 60, 62 to a controller indicated generally at 64 in the ancillary section 12. It will be understood that the controller 64 may be supplied in the ancillary section 12 with the apparatus 10 or may be alternatively supplied separately by a user. A position sensor in the form of a limit switch 66 is provided and a signal therefrom provided to the actuator for indicating the position of the operating rod 42; and, is illustrated in FIG. 1 as connected to the fluid cylinder 54 for detecting the position of the operating rod switch 66 connected to the controller 64 as indicated by line 68. The controller is supplied from a power supply 70 shown as connected along line 72, it being understood that the power supply may be provided integrally with the controller 64 if desired. The controller 64 is shown in FIG. 1 as supplied with a pneumatic source 74 for providing a pneumatic signal along line 76 to the pneumatic actuator 77 for drain valve 38 and a pneumatic signal along 78 to a pneumatic actuator 79 for the purge valve 34. It will be understood that, alternatively, actuator 77 for drain valve 38 and actuator 79 for purge valve 34 may be electrical solenoids provided with an electrical signal on lines 76, 78, respectively.

Figure 2:
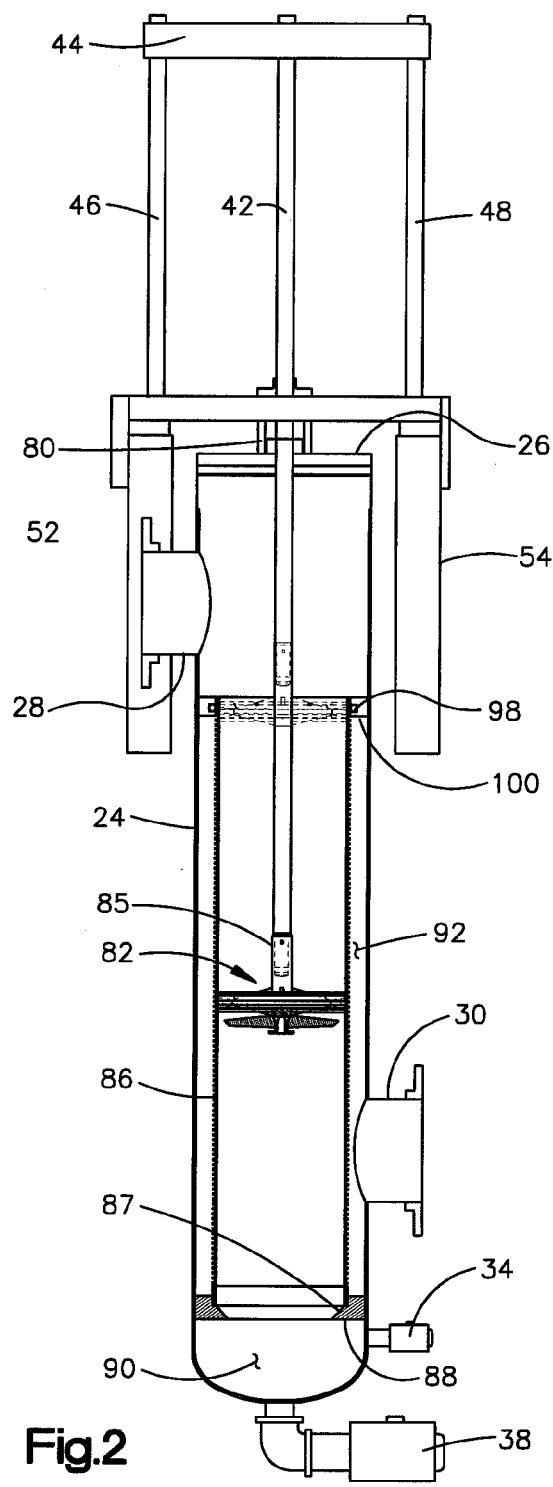
FIG. 2 is a cross-sectional view of the self-cleaning filtering apparatus of the present disclosure with the piston and main valve in a retracted position during normal fluid filtering flow.

Referring to FIG. 2, the pressure vessel 24 is shown in cross-section with the operating rod 42 extending through a sliding seal 80 in lid 26 and connected at its lower end to a piston indicated generally at 82. Referring to FIG. 6, piston 82 has an upwardly extending tube 84 which has a cross-hole 89 formed therein which is adapted to have a pin 85 received therethrough for securing the lower end of operating rod 42 to the piston. The connection is shown in detail in FIGS. 4 and 5.

With continued reference to FIG. 6, the tube 84 is connected to an outer rim 83 by a plurality of spokes 90 such that the piston rim enables fluid to flow therethrough. Disposed about the outer periphery of the rim 83 is a plurality of arcuately configured wiper segments 92 which may be formed of suitable plastic as, for example, Polyoxymethylene (POM) plastic material. However, other suitable materials such as polyurethane, polyetheretherketone (PEEK), polytetrafluoroethylene (PTFE), and ultra high molecular weight polyethylene (UHMWP) may also be used. Segments 92 are configured to closely interfit the inner surface of a filter media element as will hereinafter be described. In the present practice, the wiper segments 92 are spring loaded radially outwardly to provide a positive wiping action on the upstream side or inner surface of filter media element 86. Although a single piston version is shown, dual pistons with wipers may be utilized.

Referring to FIGS. 2, 3, 4 and 5, an annular filter media element 86 is disposed in the pressure vessel 24 with piston 82 received therein. The annular filter media element, which, in the present disclosure, has a tubular or cylindrical configuration, has its lower end sealed about an inner annular surface 93 provided on a bulkhead 88 attached to the inner surface of the pressure vessel 24. The bulkhead 88 forms on the lower face thereof with the lower portion of the pressure vessel 24, a purge chamber 90 and on the upper face thereof with the upper portion of pressure vessel 24, a filtrate chamber 92 around the outer surface or downstream side of the filter media element 86. The annular surface 87 forms a seating surface for a main valve member 94 is illustrated in the form of a tapered disc. Annular surface 87 has a groove or shoulder formed therein on which is seated an annular seal in the form of O-ring 96 for sealing about the outer periphery of the lower end of the filter media element so as to isolate an annular region of the filtering chamber 92 exposed to the downstream side of the filter media element 86 from the purge chamber 90; and, valve member 94 is seated against the surface 87.

Figure 4:
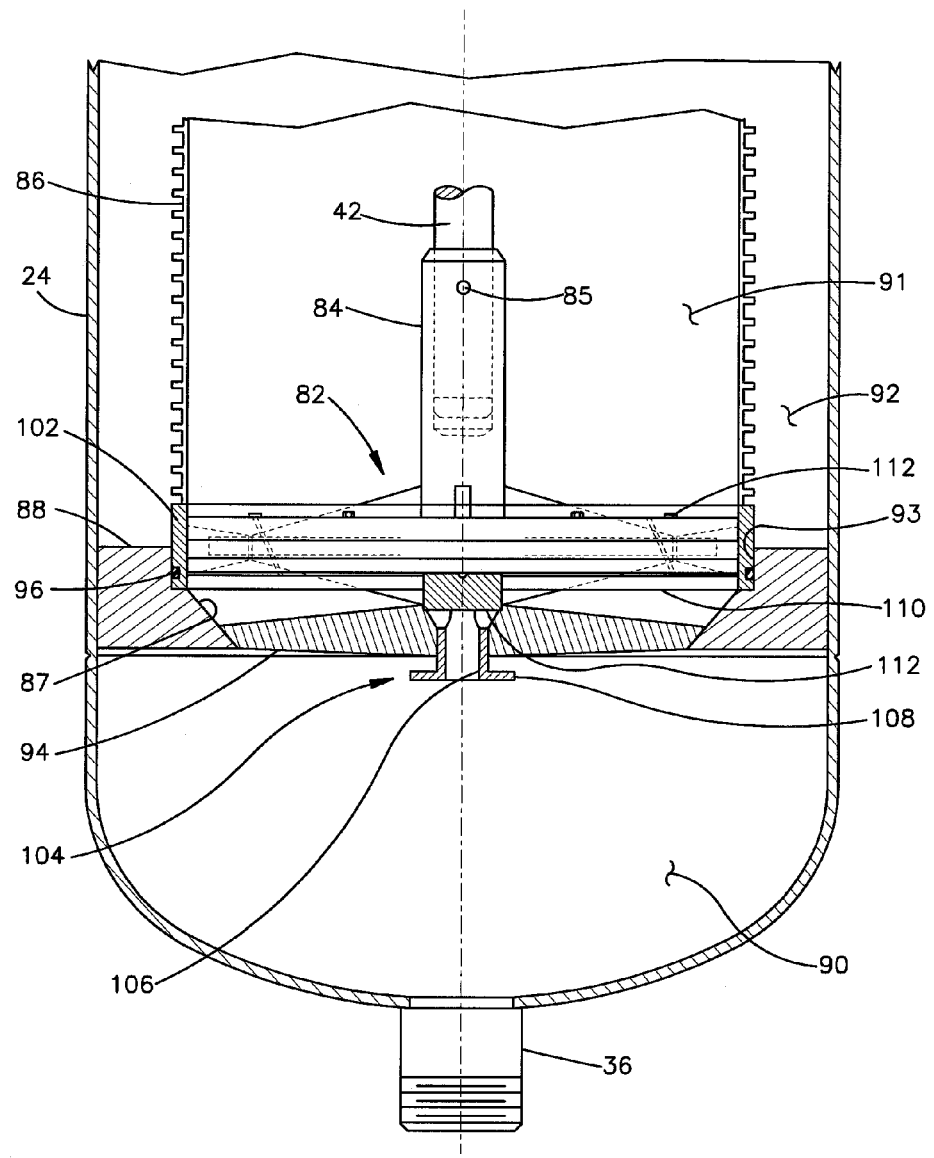
FIG. 4 is an enlarged cross-section of the lower portion of the annular filter media element in the pressure vessel showing the main valve closed and the bleed valve closed.

Referring to FIG. 4, the lower end of the filter media element is shown as having a solid ring 102 attached thereto which has a groove formed thereon for receiving an O-ring 96. It will be understood that the upper end of the filter media element 86 is similarly configured for the O-ring 98.

Figure 3:
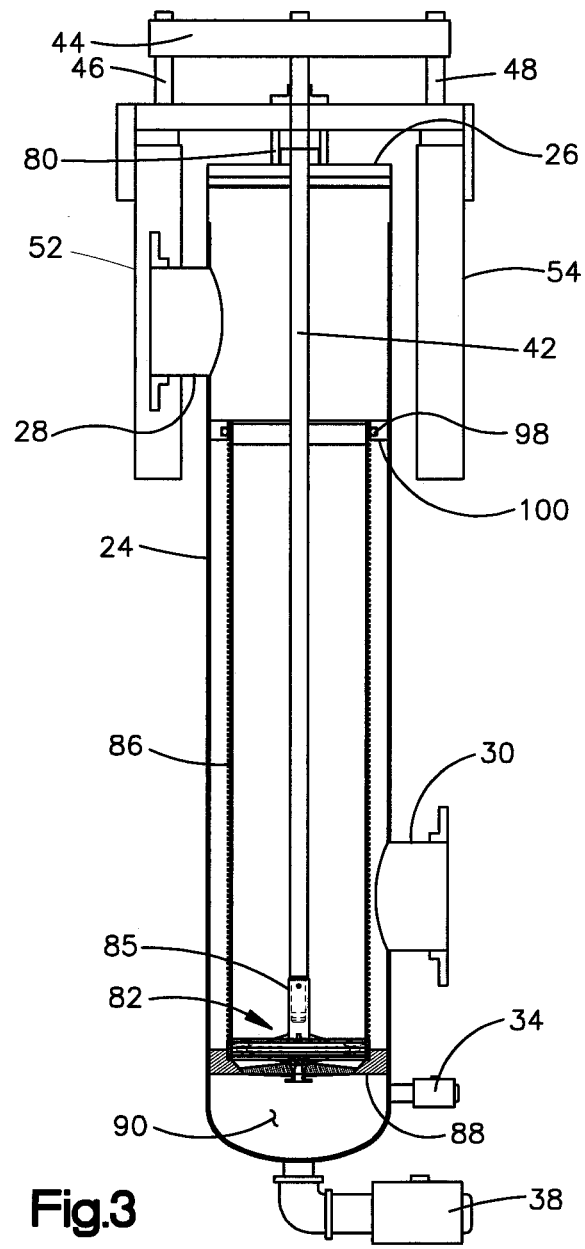
FIG. 3 is a view similar to FIG. 2 showing the downward limit of the piston stroke for wiping debris from the filter media element.

Referring to FIGS. 2 and 3, the upper end of the filter media element 86 has an O-ring seal 98 provided thereabout which seals the exterior surface or downstream side of the filter media element 86 about a ring 100 attached to the inner periphery of pressure vessel 24. O-ring seal 98 and ring 100 thus isolate the exterior or downstream side of the filter media element 86 from the inlet 28 such that the inlet 28 communicates only with the interior of the filter media element 86. Thus, the upstream side or inner surface of filter media element 86 forms, with the inner surface of pressure vessel 24 a filtering chamber 91, which communicates exclusively with inlet 28 and chamber 91 isolated from filtrate chamber 92; and, thus, fluid cannot directly flow upstream from filtering chamber 91 to downstream filtrate chamber 92.

With reference to FIG. 2, the piston 82 is shown in its upward or retracted position; and, with reference to FIG. 3, the piston 82 is shown in its downward most position having wiped the inner surface of the filter media element 86 and forced the debris accumulated thereon into the purge chamber 90.

Figure 5:
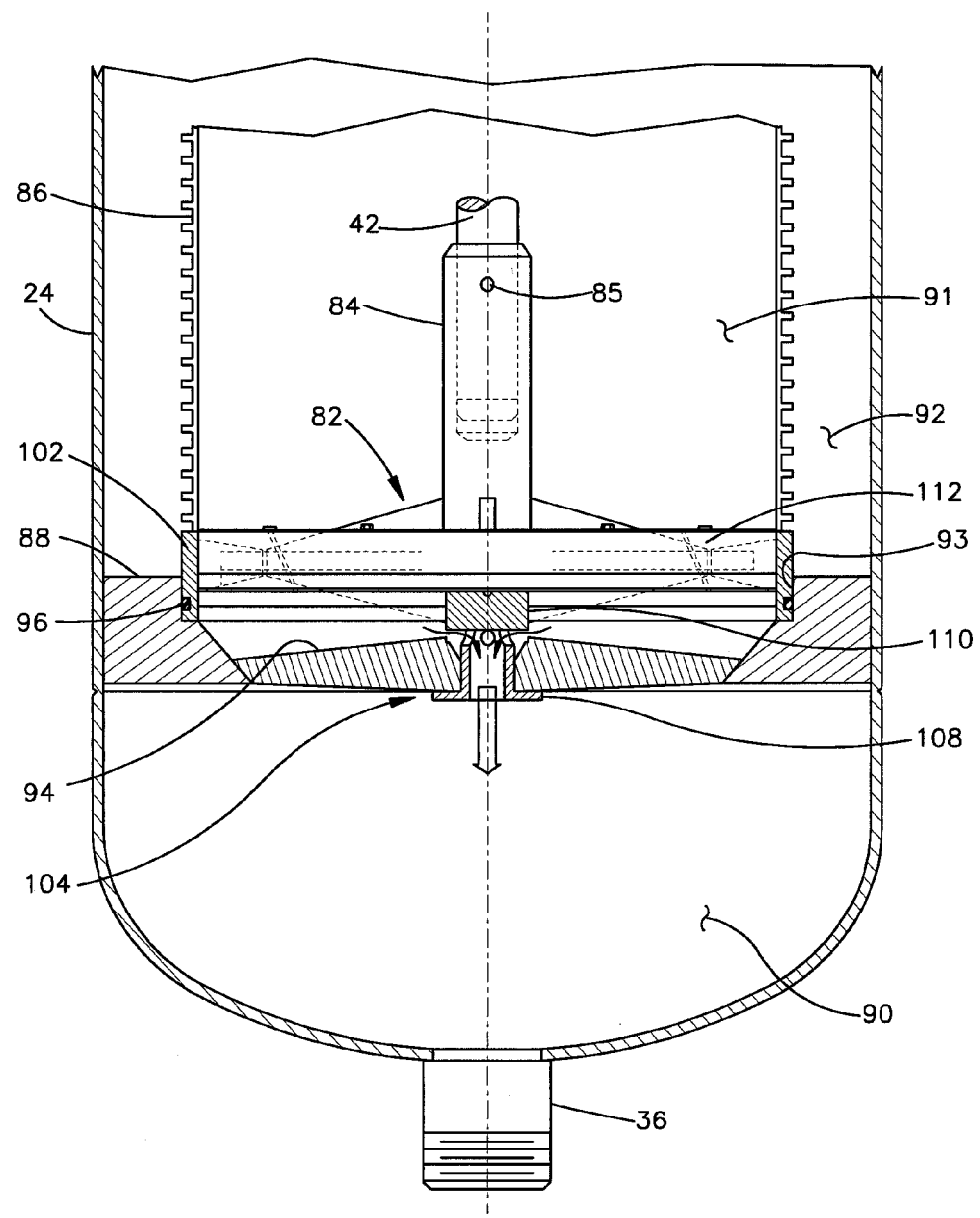
FIG. 5 is a view similar to FIG. 4 with the main valve in the closed position and the bleed vale in the open position; and, FIG. 6 is a perspective view of the piston with the wiper elements attached.
Figure 6:
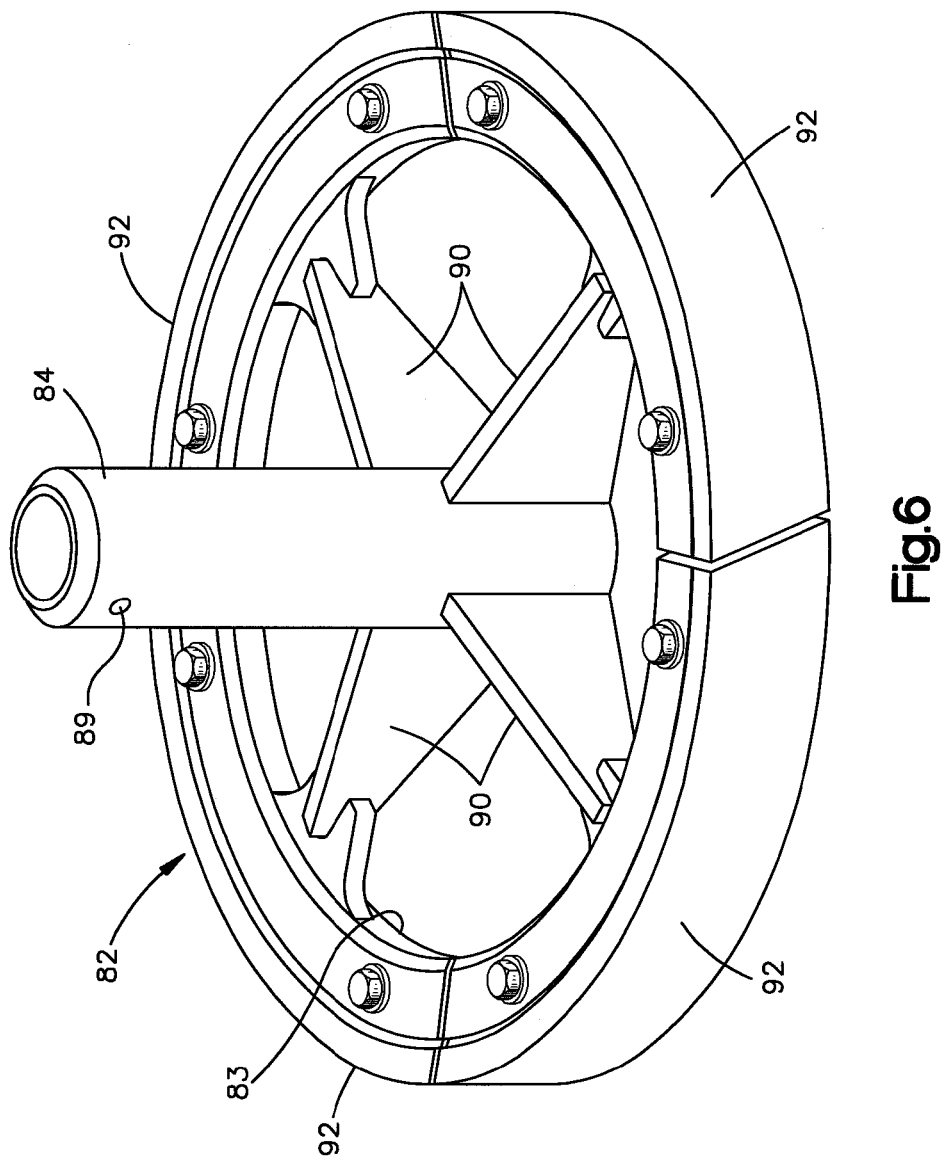

Referring to FIGS. 4 and 5, a main valve member 94 is formed such that its outer diameter seating surface is sufficiently less than the inner diameter of the filter media element 86 so fluid in filter media element 86 can flow about the piston 82 as piston 82 is moved.

A bleed valve indicated generally at 104, is disposed centrally through valve member 94 which bleed valve comprises a tubular member 106 having an outwardly extending flange 108 formed on a lower end thereof. The upper end of member 106 is closed and has a flange 110 which extends outwardly of the tubular portion 106 so as to seat on the central portion of the upper surface of main valve member 94. The tubular member 106 has a plurality of cross-holes 112 therethrough adjacent the undersurface of the flange 110; and, the length of the tubular member 106, when the lower flange 108 is seated against the undersurface of the valve member 94, such that the flange 110 is raised above the upper surface of main valve member 94 so as to permit flow from the filtering chamber 91 through cross-holes 112. It will be understood that the bleed flow through cross-holes 112 will continue until pressure equalization occurs between the filtering chamber and the purge chamber 90. The flange 110 is attached to the under surface of the piston 82 and moved upwardly to expose cross-holes 112 by upward motion of the piston 82. Further upward movement of the piston lifts valve 94 from its seat. When the piston is in its full downward extent of movement and flange 110 is seated on upper surface of the main valve member 94, the purge chamber 90 is isolated from the filtering chamber 91 and thus, the purging of chamber 90 may be accomplished without any effect of the subatmospheric pressure in either chamber 92/91.

In operation, wiping movement of the piston 82 by its actuators 52, 54 and operating rod 42 to the bottom or lower end of its travel range, is controlled by the limit switch 66, whereupon the main valve member 104 seats against the seating surface 87 on bulkhead 88; and, the flange 110 is sequentially seated upon the upper surface of the valve member 94 to isolate the member on the upper side of the bulkhead 88 from the purge chamber 90. The controller 64 is then operative to open the purge valve 38 and then open the flushing valve 34 whereupon fluid, such as steam or water, is injected at high pressure into the purge chamber forcing the accumulated solid material and debris deposited therein, by the downward wiping action of the wipers against the inner surface of the filter media element, out of the purge chamber through the valve 38 to drain 40.

When the purging is completed, the flushing valve 34 is closed by the controller 64 followed by closing of drain valve 38. The controller then signals the actuators 52, 54 to raise the operating rod to retract the piston 82 to its upward position. As the operating rod begins to move the piston 82, flange 110 of the bleed valve 112 is raised from the upper surface of the main valve member 94 exposing cross-holes 112 such that pressure equalization occurs between the purge chamber 90 and the filtering chamber 92. When pressure equalization has occurred, the actuators cause the operating rod to retract the piston to its upward position as shown in FIG. 2.

The present disclosure thus describes a unique filtering apparatus for discharging filtered fluid to subatmospheric pressure such as occurs at a pump inlet, and provides for self-purging of the upstream side of the filter media element. A moveable piston wipes the filter media element and operates a main valve for isolating a purge chamber for permitting flushing to move accumulated debris deposited therein by the wiping of the piston. Remotely operated valves provide flushing of the purge chamber. A bleed valve permits pressure equalization across the main valve to enable retracting of the piston and main valve upon completion of the purge operation.

Obviously, modifications and alterations will occur to others upon reading and understanding the preceding detailed description. It is intended that the exemplary versions described herein be construed as including all such modifications and alterations insofar as they come within the scope of the appended claims.

The invention claimed is:

1. Apparatus for self-purging a filtration unit for use in a pressurized fluid system of the type having the filtration unit disposed on the suction side of the fluid system comprising:
   (a) a pressure vessel having a bulkhead therein defining on one side a filtration chamber and on an opposing side thereof a purge chamber,
   (b) an annular filter media element disposed in the filtration chamber;
   (c) a process fluid inlet in the filtration chamber communicating exclusively with an upstream side of the annular filter media element;
   (d) a process fluid outlet in the filtration chamber communicating exclusively with a downstream side of the filter media element;
   (e) a piston disposed in the interior of the annular filter media element and including wiping surfaces thereon for wiping debris from the upstream side of the filter media element, the piston operable for movement along the axial length of the filter media element;
   (f) an elongated operating member connected to the piston and extending outwardly through a wall of the pressure vessel for effecting the movement of the piston;
   (g) actuator means connected to the elongated operating member operable, upon selective actuation, to effect the movement of the operating rod and piston;
   (h) a flushing fluid inlet and a drain outlet formed in the purge chamber;
   (i) a remotely operable flushing valve connected to the flushing inlet; and, a remotely operable drain valve connected to the drain outlet;
   (j) a main fluid passage formed through the bulkhead; and, a main valve member attached to the piston and operable to open and close the fluid passage with the movement of the piston; and
   (k) a bleed passage and bleed valve provided through the main valve member, wherein upon movement of the piston towards the fluid passage, the main valve closes the fluid passage and thereafter the bleed valve closes the bleed passage sequentially, and subsequently, upon movement of the piston away from the fluid passage, the bleed valve and bleed passage are first opened and the main valve and fluid passage opened sequentially.

2. The apparatus of claim 1, wherein the actuator means connected to the operating rod includes a pair of fluid pressure cylinders of one of pneumatic and hydraulic.

3. The apparatus of claim 1, wherein the flushing valve is a solenoid operated valve.

4. The apparatus of claim 1, wherein the bulkhead includes an annular valve seat forming the main fluid passage.

5. The apparatus of claim 4, wherein the valve seat is centrally located in the bulkhead.

6. The apparatus of claim 1, wherein the bleed valve is centrally located in the main valve member.

7. The apparatus of claim 1, wherein the bleed valve comprises a tubular member having an outwardly extending flange on each of opposite ends.

8. The apparatus of claim 7, wherein the tubular member has a plurality of cross holes adjacent the flanges proximate the piston.

9. The apparatus of claim 1, further comprising:
   a controller operably connected to the flushing valve and the drain valve for effecting sequential operation thereof.

10. The apparatus of claim 9, wherein the controller is operatively connected to the actuator means for effecting operation thereof.

11. The apparatus of claim 9, wherein the flushing valve and drain valve are pneumatically operated; and, the controller includes a source of pneumatic pressure.

12. The apparatus of claim 1, wherein the flushing valve and drain valve are vacuum operated.

13. The apparatus of claim 1, wherein the piston includes a plurality of peripheral arcuate elements disposed thereon and having the wiping surfaces formed thereon.

14. The apparatus of claim 13, wherein the arcuate elements are formed of plastic material.

15. The apparatus of claim 13, wherein the arcuate elements are formed of one of (i) polyoxymethylene (POM) plastic material, (ii) polyurethane, (iii) polyetheretherketone (PEEK), (iv) polytetrafluoroethylene (PTFE), and (v) ultra high molecular weight polyethylene (UHMWP).

16. The apparatus of claim 1, wherein the operating rod is connected to the piston by a removable pin.

17. The apparatus of claim 1, wherein the main valve member comprises a tapered disc.

18. The apparatus of claim 17, wherein the tapered disc is formed of plastic.

* * * * *